United States Patent
Murai et al.

(10) Patent No.: US 7,239,468 B2
(45) Date of Patent: Jul. 3, 2007

(54) DISK DRIVE AND CONTROL METHOD FOR DISK DRIVE

(75) Inventors: Hiroaki Murai, Kawasaki (JP); Yoshinori Inoue, Kawasaki (JP); Takehiro Ogawa, Kawasaki (JP); Satoru Fukase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/997,231

(22) Filed: Nov. 23, 2004

(65) Prior Publication Data

US 2006/0007582 A1    Jan. 12, 2006

(30) Foreign Application Priority Data

Jul. 9, 2004    (JP)    ............................. 2004-203900

(51) Int. Cl.
*G11B 15/18*    (2006.01)
*G11B 19/02*    (2006.01)

(52) U.S. Cl. .......................... 360/69; 360/71; 713/300; 710/8

(58) Field of Classification Search ...................... None
See application file for complete search history.

(56) References Cited

U.S. PATENT DOCUMENTS 5,659,762 A * 8/1997 Sawada et al. ............. 713/323

FOREIGN PATENT DOCUMENTS

| JP | 63-53753 | 3/1988 |
|---|---|---|
| JP | 7-192380 | 7/1995 |
| JP | 7-271518 | 10/1995 |
| JP | 9-54742 | 2/1997 |

* cited by examiner

*Primary Examiner*—Andrew L. Sniezek
(74) *Attorney, Agent, or Firm*—Greer, Burns, & Crain, Ltd.

(57) ABSTRACT

After the power supply of a disk drive that uses a head to write data at any position on a disk or read data written at any position is turned on, the first initial conditions for the disk drive that are needed to receive a command from outside and execute the command are determined. The disk drive is then brought to a state in which it can receive the command but the spindle motor is not started. After the disk drive is brought to the state in which it can receive the command, the spindle motor is started and the second initial conditions including all initial conditions other than the first initial conditions are determined. Moreover, a control method for a disk drive that is implemented in the above disk drive is disclosed.

3 Claims, 15 Drawing Sheets

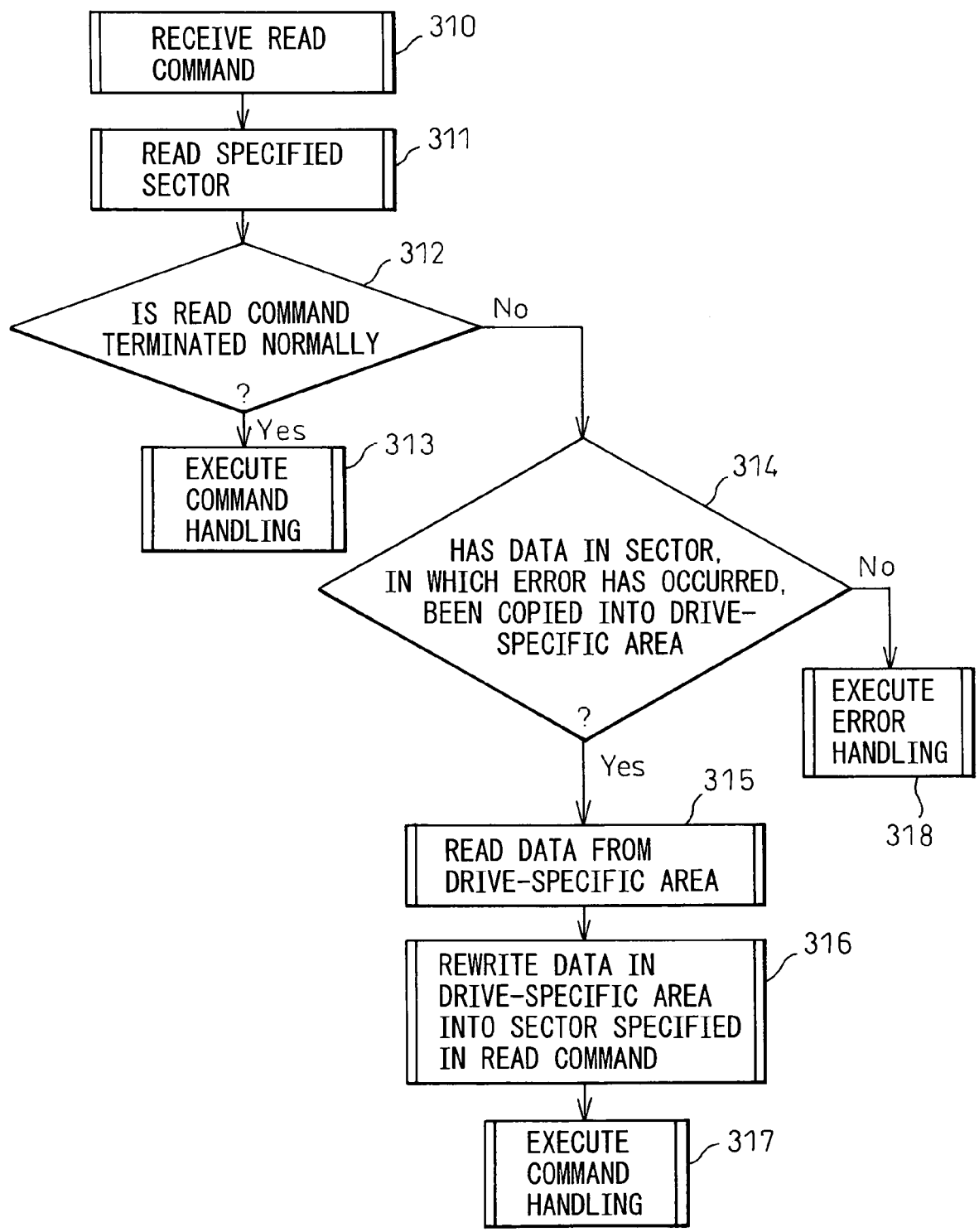

DISK DRIVE AND CONTROL METHOD FOR DISK DRIVE

BACKGROUND OF THE INVENTION

1. Field of the Invention

The present invention relates to a disk drive (for example, a magnetic disk drive) that uses a head to write data at any position on a magnetic disk or any other type of disk or read data written at any position thereon. More particularly, the present invention is concerned with a disk drive having the capability to shorten a startup time of equipment connected to a main disk drive unit, and the capability to improve the reliability of data, of which the use frequency is high, at the time of startup of the equipment. Moreover, the present invention is concerned with a control method, for a disk drive, controlling the disk drive after the power supply of the disk drive is turned on or during writing or reading of data.

2. Description of the Related Art

Conventionally, first, after the power supply of a disk drive such as a magnetic disk drive is turned on, the disk drive is controlled in a mode in which, after a setup, including determination of the initial conditions for the disk drive and start of a spindle motor, is completed, the busy state of a disk is canceled so that the disk drive will enter a command receivable state in which the disk drive can receive a command from an external host processor or the like.

Secondly, when a power-up-in-standby capability is used to cancel the busy state without start of the spindle motor, the disk drive is controlled in a mode in which on receipt of a Read command or any other command requiring access to a storage medium such as a disk, the spindle motor is started and the storage medium is accessed.

For an easy understanding of problems underlying a conventional control method of controlling a disk drive after the power supply of the disk drive is turned on or during writing or reading of data, the conventional control method for a disk drive will be described in conjunction with FIG. 1 to FIG. 3 that will be mentioned later in "Brief Description of the Drawings."

FIG. 1 illustrates a flowchart describing a first example of the conventional control method for a disk drive relevant to the first control mode. FIG. 2 illustrates a flowchart describing a second example of the conventional control method for a disk drive relevant to the second control mode. FIG. 3 illustrates a flowchart describing a third example of the conventional control method for a disk drive relevant to the second control mode.

Referring to the flowcharts of FIG. 1 to FIG. 3, the first to third examples of the conventional control method for a disk drive will be described below.

As apparent from the flowchart of FIG. 1, when the power supply of a disk drive is turned on at step 400, the initial conditions for the disk drive are determined at step 401. The determination of the initial conditions includes self-diagnosis of hardware of the disk drive and determination of settings thereof, and determination of settings of firmware (or software) installed in the disk drive. Furthermore, after the start of the spindle motor (may be abbreviated to SPM) is completed at step 402, the rotation of the spindle motor becomes steady-state. Thereafter, drive-specific information representing the attributes of the disk drive is read at step 403. Thereafter, the busy state of the disk drive is canceled at step 404, and a command reception wait state (command receivable state) is established at step 405. In this case, an external host processor or the like cannot issue a command until the busy state is canceled.

The flowchart of FIG. 2 describes an example of a control method for a disk drive to be applied in a case in which the spindle motor is not started but a power-up-in-standby capability is used to cancel a busy state. Herein, the power supply of the disk drive is turned on at step 410, and the initial conditions for the disk drive are determined at step 411. Thereafter, at step 412, the busy state of the disk drive is canceled but the spindle motor is not started. The command reception wait state (command receivable state) is established at step 413. Even in this state, the external host processor or the like cannot issue a command until the busy state is canceled.

Furthermore, an interrupt to be performed when a command is received from an external host processor or the like will be described in conjunction with the flowchart of FIG. 3. At steps 420 and 421 in the flowchart of FIG. 3, a Read command or any other medium access request command that requires access to a storage medium (for example, a disk) is received. If the storage medium is verified to be accessible (step 422), a command executor executes the command (step 425). If the storage medium is verified to be inaccessible because the spindle motor is not started, the spindle motor is started at step 423 in order to access the storage medium. Thereafter, after the start of the spindle motor is completed, the rotation thereof becomes steady-state. Thereafter, drive-specific information representing the attributes of the disk drive is read at step 424.

By the way, information important for activating equipment (for example, a host system such as a host processor) connected to the main disk drive unit is often written in a sector near a sector located at the leading position on a disk. Therefore, immediately after the power supply of the disk drive is turned on and the busy state thereof is canceled, a Read command is often issued in order to read the sector near the sector located at the leading position on the disk.

In general, storage media including a disk comprise a plurality of concentric tracks that can be accessed by a head. Each track is segmented into a plurality of regions. Each of the regions is called a "sector."

According to the conventional control method for a disk drive described in conjunction with FIG. 1 to FIG. 3, problems (1) to (4) described below take place.

(1) Immediately after the power supply of the disk drive is turned on, the busy state of the disk drive is not canceled until setup including start of the spindle motor is fully completed. Therefore, equipment connected to the main disk drive unit cannot issue a command as long as the magnetic disk drive is busy. A command instructing startup of equipment connected to the main disk drive unit cannot be issued until the busy state of a disk is canceled.

(2) When the power-up-in-standby capability is utilized, as the spindle motor is not started, the time from the instant the power supply is turned on to the instant the busy state is canceled is shortened. In this case, a command other than a medium access request command is handled immediately. However, when a Read command or any other medium access request command is issued, after the spindle motor is started, a storage medium cannot be accessed until the rotation of the spindle motor becomes steady-state. Therefore, a command handling time at which a medium access request command is handled is delayed.

(3) The time from the instant the power supply of the disk drive is turned on to the instant the busy state thereof is canceled, and a delay in a command handling time occurring after the busy state is canceled are reflected on the startup time of equipment connected to the main disk drive unit.

(4) Furthermore, information important for starting up equipment connected to the main disk drive unit is often written in an area starting with a sector located at the leading position on a disk in the disk drive and including several sectors. If the information cannot be read, equipment connected to the main magnetic disk drive may not be started up.

For reference, Patent Documents 1 to 4 relating to the conventional control method for a disk drive are listed below. The arts disclosed in the Patent Documents 1 to 4 share the same problems as the aforesaid ones underlying the conventional control method for a disk drive.

1. Patent Document 1: Japanese Unexamined Patent Publication (Kokai) No. 7-271518
2. Patent Document 2: Japanese Unexamined Patent Publication (Kokai) No. 9-54742
3. Patent Document 3: Japanese Unexamined Patent Publication (Kokai) No. 63-53753
4. Patent Document 4: Japanese Unexamined Patent Publication (Kokai) No. 7-192380

SUMMARY OF THE INVENTION

The present invention addresses the foregoing problems. An object of the present invention is to provide a disk drive and a control method for a disk drive in which the startup time of equipment such as a host processor connected to a main disk drive unit can be shortened and the reliability of data, whose use frequency is high, can be improved at the time of startup of the equipment.

For accomplishing the above object, a disk drive in accordance with the first aspect of the present invention includes a spindle motor that drives a disk so that the disk can rotate, and a voice coil motor that drives a head so that the head will reciprocate between a position inside the disk and a position outside it, and that has the capability to use the head to write data at any position on the disk or to read data written at any position. The disk drive comprises: a first initial-condition determination means for, after the power supply of the disk drive is turned on, determining the initial conditions for the disk drive required for receiving a command from outside and executing the command; a command reception enabling means for bringing the disk drive to a state, in which the disk drive can receive the command, without starting the spindle motor; and a second initial-condition determination means for, after the disk drive is brought to the state in which it can receive the command, starting the spindle motor and determining the second initial conditions including all initial conditions other than the first initial conditions.

A disk drive in accordance with the second aspect of the present invention includes a spindle motor that drives a disk so that the disk can rotate and a voice coil motor that drives a head so that the head will reciprocate between a position inside the disk and a position outside it, and that has the capability to use the head to write data at any position on the disk or to read data written at any position. When a Write command is issued in order to write data in an area starting with a sector located at the leading position on the disk and ending with a sector located at a predetermined position, the data is copied into a nonvolatile memory that can hold the data even after the power supply of the disk drive is turned off.

Preferably, according to the second aspect, assuming that the spindle motor is not started or the rotation of the spindle motor has not become steady-state, when a Read command is issued in order to read data, if an area including a sector specified in the data falls within the area in which the data held in the nonvolatile memory is written, the data held in the nonvolatile memory is read.

A disk drive in accordance with the third aspect includes a spindle motor that drives a disk so that the disk can rotate and a voice coil motor that drives a head so that the head will reciprocate between a position inside the disk and a position outside it, and that has the capability to use the head to write data at any position on the disk or to read data written at any position. When a Write command is issued in order to write data in an area starting with a sector located at the leading position on the disk and ending with a sector located at a predetermined position, the data is written in a drive-specific area on the disk that cannot be accessed in response to a normal Write command. Thereafter, the data is written in an area on the disk that can be accessed in response to the normal Write command.

According to the present invention, there is provided a control method, for a disk drive which includes a spindle motor that drives a disk so that the disk can rotate and a voice coil motor that drives a head so that the head will reciprocate between a position inside the disk and a position outside it, and which uses the head to write data at any position on the disk or read data written at any position. The control method for a disk drive comprises the steps of: after the power supply of a disk drive is turned on, determining the first initial conditions for the disk drive which are required for receiving a command from outside and executing the command; bringing the disk drive to a state, in which the disk drive can receive the command, without starting the spindle motor; and after the disk drive is brought to the state in which it can receive the command, starting the spindle motor and determining the second initial conditions that include all initial conditions other than the first initial conditions.

In short, according to the present invention, first, after the power supply of a disk drive is turned on, only the initial conditions (first initial conditions) for hardware and firmware that are needed to receive and execute a command (a command other than a medium access request command) are determined. The busy state of the disk drive is canceled but the spindle motor is not started. After the busy state is canceled, the spindle motor is started and the remaining initial conditions (second initial conditions) are determined.

Thus, the time from the instant the power supply of the disk drive is turned on to the instant the busy state of the disk is canceled is shortened. Consequently, equipment connected to a main magnetic disk drive unit can issue a command to the disk drive in an earlier stage. Eventually, the startup time of the equipment elapsing until the busy state is canceled can be shortened. Even after the busy state is canceled, setup including start of the spindle motor is carried out. Therefore, even if a medium access request command requiring access to a disk or any other storage medium is received, the response time required to respond to the command can be shortened.

According to the present invention, secondly, if a Write command is issued in order to write data in an area starting with a sector located at the leading position on a disk and including several sectors, the data is copied into a nonvolatile memory that can hold the data even after the power supply of the disk drive is turned off. Therefore, even when the spindle motor is not started or the rotation of the spindle motor has not become steady-state, if a Read command is issued in order to read data, as long as an area including a sector specified in the data falls within the area in which the data held in the nonvolatile memory is written, the data held in the nonvolatile memory is employed. Thus, the data can be transferred without the necessity of accessing the storage medium.

Furthermore, according to the present invention, thirdly, when a Write command is issued in order to write data in an area including a sector located at the leading position on a disk, after the data is written in a drive-specific area on the disk that cannot be accessed in response to a normal Write command, the data is written in an area on the disk that can be accessed in response to the normal Write command. Therefore, when a Read command is issued in order to read the data, if data located near the leading position on the disk cannot be read because of any error, the drive-specific area containing the data to be written in the sectors is read in order to overcome the error. Consequently, an event that equipment connected to a main disk drive unit is not started up can be avoided. As a result, the reliability of data, whose use frequency is high, can be improved at the time of starting up the equipment.

Complementarily, according to the present invention, if any error occurs during reading of data from near the leading position on a disk, data written in the drive-specific area is used and rewritten in a sector near the leading position on the disk. Thus, a sector in which an error occurs can be restored.

BRIEF DESCRIPTION OF THE DRAWINGS

The above object and features of the present invention will be more apparent from the following description of some preferred embodiments with reference to the accompanying drawings, wherein:

FIG. 7 is a timing chart indicating changes in states of components occurring when the power supply of a conventional disk drive is turned on;

FIG. 8 is a timing chart indicating changes in states of components occurring when the power supply of the disk drive in accordance with the present invention is turned on;

FIG. 15 is a flowchart (part 2) describing the control method for a disk drive in accordance with the third embodiment of the present invention.

DESCRIPTION OF THE PREFERRED EMBODIMENTS

Hereinafter, a description of some preferred embodiments according to the present invention will be given with reference to the accompanying drawings (FIG. 4 to FIG. 15).

Figure 4:
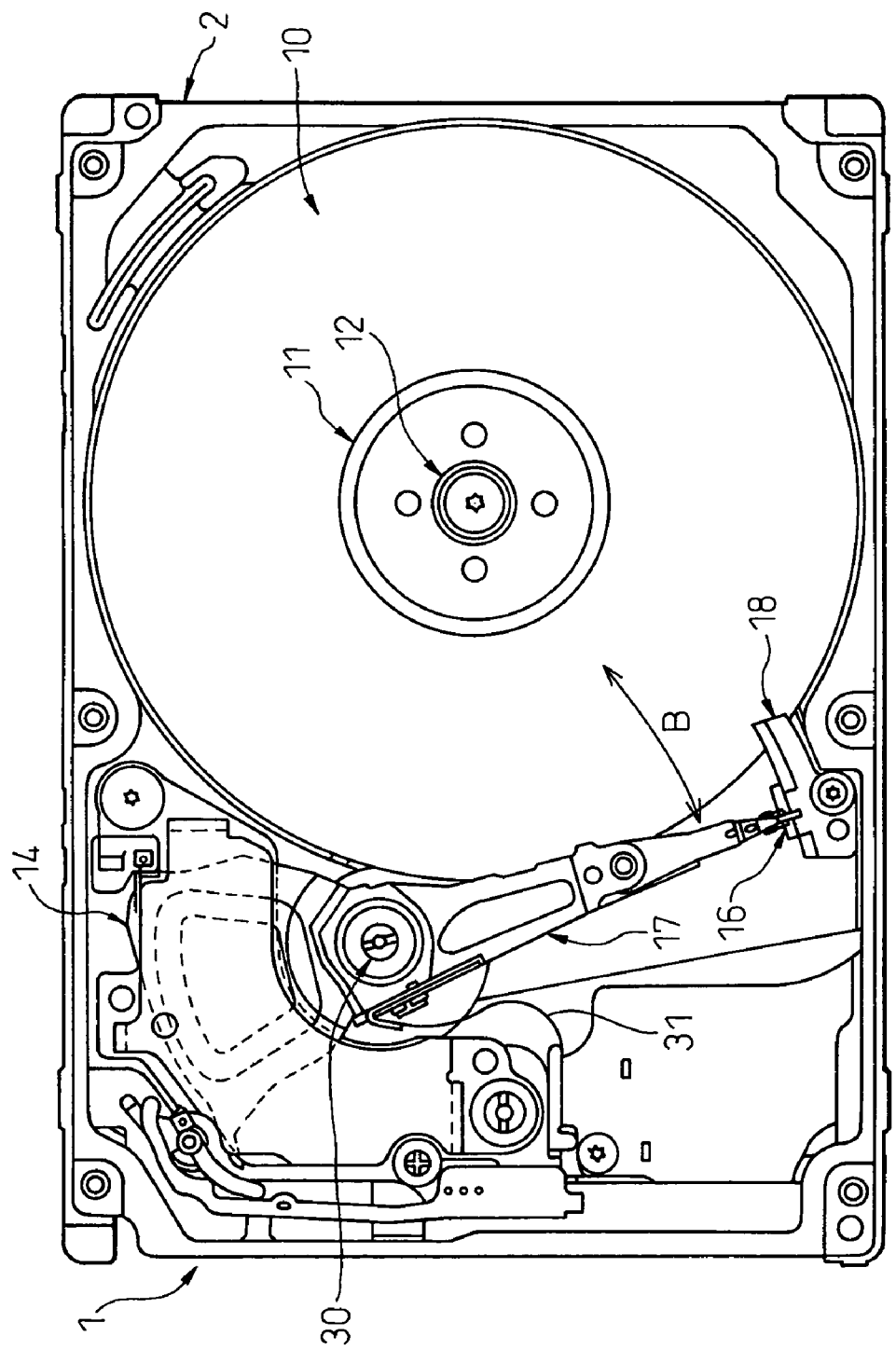
FIG. 4 is a plan view showing the outline structure of a mechanical portion of a disk drive in accordance with an embodiment of the present invention.
Figure 5:
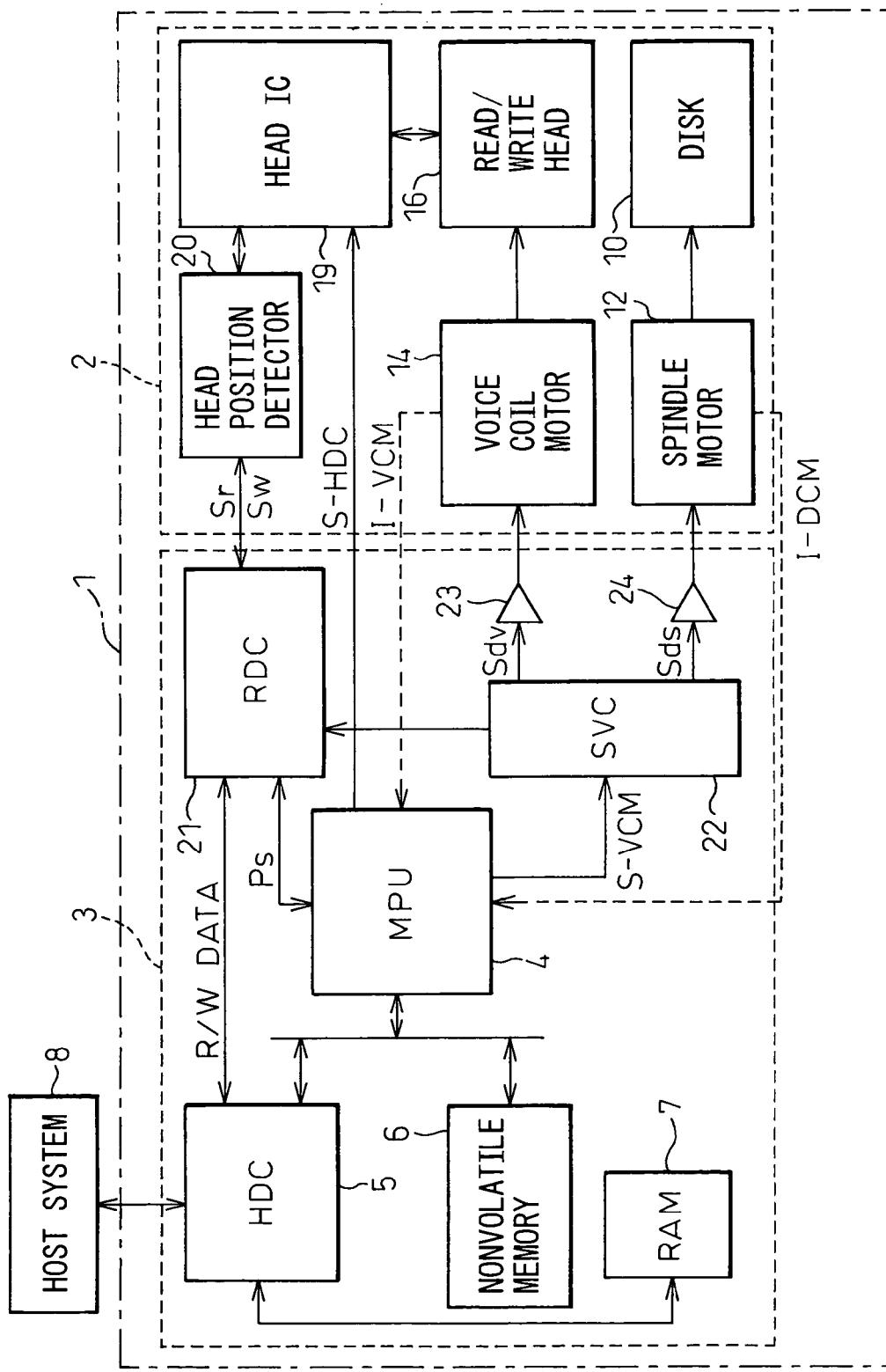
FIG. 5 is a block diagram showing the configuration of a control unit included in the disk drive in accordance with the embodiment of the present invention.

FIG. 4 is a plan view showing the outline structure of a mechanical portion of a disk drive in accordance with an embodiment of the present invention, and FIG. 5 is a block diagram showing the configuration of a control unit included in the disk drive in accordance with the embodiment of the present invention.

Herein, as an embodiment of a disk drive in accordance with the present invention, a magnetic disk drive or any other disk drive 1 having a head that is used to write or read data in or from a hard disk or any other type of disk 10 that can rotate is illustrated. A read/write head 16 structured to have a reading head element and a writing head element integrated thereinto is adopted as the head. Hereinafter, the same reference numerals will be assigned to components identical to those described previously.

The disk drive 1 shown in FIG. 4 broadly comprises a disk 10 included in the disk drive, the read/write head 16, a disk enclosure 2 in which a spindle motor 12 and a voice coil motor 14 are stored, and a printed-circuit assembly 3 on which a control unit for controlling data writing and data reading to be performed by the read/write head 16 is mounted. In the disk enclosure 2, the disk 10 that rotates, such as, a sole hard disk or a plurality of hard disks that is driven to rotate by the spindle motor 12 coupled to a spindle 11 is stored concentrically. The motion of the spindle motor 12 is controlled by a servo controller 22 (see FIG. 5 in which the servo controller is abbreviated to SVC). A plurality of tracks (or a plurality of cylinders) is formed on a magnetic recording surface that is the face (or back) of the disk 10. A data pattern corresponding to predetermined data is written in a sector located at any position on the track.

Herein, what is referred to as a "cylinder" is a term signifying a set of tracks (that is, a plurality of cylindrical tracks) that is stacked vertically and can be accessed simultaneously by a plurality of read/write heads positioned on respective disks.

According to the embodiment of the present invention, after the power supply (not shown) of the disk drive is turned on, the initial conditions for hardware and firmware required for receiving a command (for example, a command other than a medium access request command) from a host system 8 (see FIG. 5) such as an external host processor are determined. A microprocessor unit (see FIG. 5) (hereinafter abbreviated to MPU) 4 cancels the busy state of the disk 10 with the spindle motor 12 not started. Furthermore, after the MPU 4 cancels the busy state of the disk 10, the MPU 4 starts the spindle motor 12 and determines the remaining initial conditions for hardware and firmware.

Consequently, the time from the instant the power supply of the disk drive 1 is turned on to the instant the busy state is canceled is shortened. Equipment such as the host system 8 connected to the magnetic disk drive 1 can issue a command to the disk drive 1 at an earlier stage. Eventually, the startup time of the equipment, that is, the time elapsing until the busy state is canceled can be shortened. Furthermore, after the busy state is canceled, the spindle motor 12 is started uninterruptedly. Therefore, even when a medium access request command that requires access to the disk 10 is received, a response time needed to respond to the command can be shortened.

To be more specific, as far as a disk drive adopting a servo-surface servo system is concerned, a magnetic recording surface of one of the plurality of disks 10 serves as a servo surface having a servo signal pattern, which corresponds to a servo signal to be used for servo control, formed thereon, and the magnetic recording surfaces of the other disks serve as data surfaces having data patterns formed thereon. In contrast, in a disk drive adopting a data-surface servo system, both the data pattern and servo signal pattern are formed on the respective magnetic recording surfaces of the plurality of disks. Recently, the latter disk drive adopting the data-surface servo system is more likely to be used.

Furthermore, the disk drive 1 shown in FIG. 4 includes the read/write head 16 that writes data at any position on the magnetic recording surface of the disk 10 and reads data written at any position on the magnetic recording surface. The read/write head 16 is attached to the distal part of a head supporting arm 17. The arm 17 is driven to reciprocate between a position inside the disk 10 and a position outside it. Consequently, the read/write head 16 can access all sectors on the magnetic recording surface of the disk 10 on which data is written. For smooth reciprocation of the arm 17, a pivot bearing 30 is attached to the center of the voice coil motor 14.

For example, when the arm 17 is turned in the directions of arrows B by the voice coil motor 14, the read/write head 16 moves in radial directions on the disk 10 and can scan a desired track. Components including the voice coil motor 14 and arm 17 may be referred to as a head actuator. Furthermore, a flexible printed circuit (normally abbreviated to a FPC) board 31 is attached to the head actuator. A servo signal Sdv (see FIG. 5) with which the motions of the voice coil motor 14 and read/write head 16 are controlled is supplied over the flexible printed circuit board 31.

A ramp mechanism 18 is located outside the periphery of the disk 10 and engaged with the tip of the arm 17 in order to keep the read/write head 16 away from the disk 10.

Furthermore, the disk drive 1 includes an interface connector (not shown) via which the control unit included in the disk drive 1 (see FIG. 5) is connected to the external host system 8 (see FIG. 5).

Referring to FIG. 5, the configuration of the control unit included in the disk drive in accordance with the embodiment of the present invention will be described below.

As shown in FIG. 5, a reproduction signal read from the disk by the read/write head 16 is transferred to a head IC 19 included in the disk enclosure 2. A head position detector 20 detects and amplifies the signal, and then transfers the resultant signal to the printed-circuit assembly 3.

In the control unit shown in FIG. 5, a reading channel (in FIG. 5, abbreviated to RDC) 21 that demodulates the reproduction signal Sr transferred from the head IC 19 so as to obtain data information and servo information Ps, and the MPU 4 that controls all motions relevant to reading or writing of data according to the servo information Ps provided by the reading channel 21 are mounted on the printed-circuit assembly 3. Positional information representing the position of a track on the disk of the read/write head 16 can be sampled from the servo information Ps.

Furthermore, in the control unit shown in FIG. 5, a hard disk controller (in FIG. 5, abbreviated to HDC) that controls motions to be performed in the disk drive 1 in response to a command issued from the host system 8 located outside the disk drive 1, such as, a host processor, a random access memory (RAM) 7 in which data to be read or written is temporarily stored, a nonvolatile memory 6 such as a flash read-only memory (normally abbreviated to FROM) in which a program for executing data reading or writing is saved, and a servo controller 22 that controls the motions of the spindle motor 12 and voice coil motor 14 are mounted on the printed-circuit assembly 3. Preferably, a high-speed large-capacity dynamic RAM (normally abbreviated to DRAM) is adopted as the RAM 7.

In the control unit having the foregoing components, when the host system 8 issues a Write command instructing data writing, the MPU 4 acts based on a program stored in advance in the nonvolatile memory 6, and transmits a reading channel control signal to the reading channel 21. Based on a reading/writing data signal (R/W DATA), the reading channel 21 transmits a writing signal Sw to the head IC 19. The head IC 19 amplifies the writing signal Sw and transmits the resultant signal to the read/write head 16.

On the other hand, when the host system 8 issues a Read command instructing data reading, the MPU 4 acts based on a program stored in advance in the non-volatile memory 6 and transmits a hard disk control signal S-HDC to the head IC 19. The head IC 19 amplifies a reproduction signal provided by the read/write head 16, and transmits the resultant signal to the reading channel 21. The reading channel 21 checks a writing/reading data signal (R/W DATA) to see if the reproduction signal Sr is read from a sector located at a correct position on the disk. The reading channel 21 then transmits servo information Ps, which contains positional information representing the position of the sector, to the MPU 4.

The MPU4 produces a VCM control signal S-VCM, based on which the motion of the voice coil motor 14 is controlled, using various control signals sent from the host system 8 and servo information Ps, and transmits the VCM control signal to the servo controller 2. A servo signal Sdv produced for the voice coil motor on the basis of the VCM control signal S-VCM is supplied to the voice coil motor 14 via a driver 23. Based on the servo signal Sdv, the voice coil motor 14 is started (a current I-VCM flows through the voice coil motor 14). A seek during which the read/write head 16 finds a designated position, and other actions, are executed. At the same time, the servo signal Sds produced based on the VCM control signal S-VCM for the spindle motor is supplied to the spindle motor 12 via a driver 24. The spindle motor 12 is started based on the servo signal Sds (a current I-DCM flows through the spindle motor 12), and the disk 10 is driven to rotate.

The foregoing configuration of the control unit is fundamentally identical to that of a control unit included in a generally employed magnetic disk drive.

According to the embodiment of the present invention, the MPU 4 comprises: a first initial-condition determination means for, after the power supply of the disk drive 1 is turned on, determining the initial conditions (first initial conditions) for hardware and firmware included in the disk drive 1 needed to receive a command (for example, a command other than a medium access request command) from the external host system 8 and executing the command; a command reception enabling means for bringing the disk drive to a state, in which the disk drive can receive the command, by canceling the busy state of the disk 10 without starting the spindle motor 12; and a second initial-condition determination means for, after the disk drive 1 is brought to the state in which it can receive the command, starting the spindle motor 12 and determining the remaining initial conditions (second initial conditions) for hardware and firmware.

On the other hand, the MPU 4 has a facility that, when a Write command is issued in order to write data in an area starting with a sector located at the leading position on the disk 10 and including several sectors, instructs copying of the data into the nonvolatile memory 6 that can hold data even after the power supply of the disk drive 1 is turned off.

Preferably, the MPU 4 has a facility that, although the spindle motor 12 is not started or the rotation of the spindle motor 12 has not become steady-state, when a Read command is issued in order to read data, if an area including a sector specified in the data falls within the area in which the data held in the nonvolatile memory 6 is written, instructs a computer to read the data held in the nonvolatile memory 6.

On the other hand, the MPU 4 has a facility that, when a Write command is issued in order to write data in an area starting with a sector located at the leading position on the disk and including several sectors, instructs a computer to write data in a drive-specific area on the disk 10 that cannot be accessed in response to a normal Write command and then write the data in an area on the disk 10 that can be accessed in response to the normal Write command.

Preferably, the MPU 4 has a facility that, when a Read command is issued in order to read data, if data cannot be read from near the leading position on the disk 10, instructs a computer to read data written in the drive-specific area.

More preferably, the MPU 4 has a facility that, when a Read command is issued in order to read data, if an error occurs during reading of data from near a sector located at the leading position on the disk 10, instructs a computer to use data written in the drive-specific area to re-write the data near the sector located at the leading position on the disk 10.

To be more specific, a program saved in the nonvolatile memory 6 included in the control unit shown in FIG. 5 comprises: a step of, after the power supply of the disk drive 1 is turned on, determining the initial conditions for hardware and firmware included in the disk drive 1 which are needed to receive a command from the external host system 8 and execute the command; a step of bringing the disk drive 1 to a state, in which the disk drive can receive the command, by canceling the busy state of the disk 10 without starting the spindle motor 12; and a step of, after the disk drive is brought to the state in which it can receive the command, starting the spindle motor 12 and determining the remaining initial conditions for hardware and firmware.

On the other hand, a program saved in the nonvolatile memory 6 comprises: a step of, when a Write command is issued in order to write data in an area starting with a sector located at the leading position on the disk and including several sectors, copying the data into the nonvolatile memory 6 that can hold the data even after the power supply of the disk drive 1 is turned off; and a step of, although the spindle motor 12 is not started or the rotation of the spindle motor 12 has not become steady-state, when a Read command is issued in order to read data, if an area including a sector specified in the data falls within the area in which the data held in the nonvolatile memory 6 is written, reading the data held in the nonvolatile memory 6.

On the other hand, a program saved in the nonvolatile memory 6 comprises: a step of, when a Write command is issued in order to write data in an area starting with a sector located at the leading position on the disk 10 and including several sectors, writing the data in a drive-specific area on the disk 10 that cannot be accessed in response to a normal Write command, and thereafter writing the data in an area on the disk 10 that can be accessed in response to the normal Write command; a step of, when a Read command is issued in order to read data, if data cannot be read from near the leading position on the disk 10, reading data written in the drive-specific area; and a step of, when an error occurs during reading of data from near a sector located at the leading position on the disk 10, using the data written in the drive-specific area to rewrite the data near the sector located at the leading position on the disk 10.

Furthermore, according to the embodiment of the present invention, when a computer-readable storage medium (or a storage medium) is used to activate the control unit shown in FIG. 5, a storage medium holding the contents of the foregoing program (for example, the disk 10 such as a hard disk included in the disk drive 1) is preferably prepared. Incidentally, the storage medium employed in the embodiment is not limited to the foregoing one. Alternatively, the present embodiment can be provided in various storage media, including a portable medium, such as a floppy disk or a compact disk read-only memory (CD-ROM), and any other type of fixed medium.

According to the embodiment, after the power supply of the disk drive is turned on, only the initial conditions needed to receive a command and execute the command are determined. The busy state is canceled without start of the spindle motor. Consequently, the time from the instant the power supply is turned on to the instant the busy state is canceled can be shortened. Consequently, the host system connected to the main magnetic disk drive can issue a command to the disk drive in an earlier stage. The startup time of the host system required until the busy state is canceled is shortened.

According to the embodiment, when a Write command is issued in order to write data in an area starting with a sector located at the leading position on the disk and including several sectors, the data is copied into the nonvolatile memory. Consequently, although the spindle motor is not started or the rotation of the spindle motor has not become steady-state, when a Read command is issued in order to read data, if an area including a specified sector falls within the area in which the data held in the nonvolatile memory is written, the data in the nonvolatile memory is utilized. Thus, the data can be transferred without access to a disk.

Furthermore, according to the embodiment, if a Write command is issued in order to write data in an area including a sector located at the leading position on the disk, the data is written in the drive-specific area on the disk that cannot be accessed in response to a normal Write command. Thereafter, the data is written in an area that can be accessed in response to the normal Write command. Therefore, when a Read command is issued in order to read the data, if data cannot be read from near the leading position on the disk, the drive-specific area in which the data to be written in the sector is written is read in order to prevent occurrence of the error. Consequently, an event that the host system connected to the main disk drive unit cannot be started up can be avoided.

According to the embodiment, if an error occurs during reading of data from near the leading position on the disk, data written in the drive-specific area is used to rewrite the data in a sector near the leading position on the disk. Thus, the sector in which the error has occurred can be restored.

Referring to FIG. 6 to FIG. 15, exemplary embodiments of a disk drive control method implemented in the embodiment of the present invention will be described below.

Figure 6:
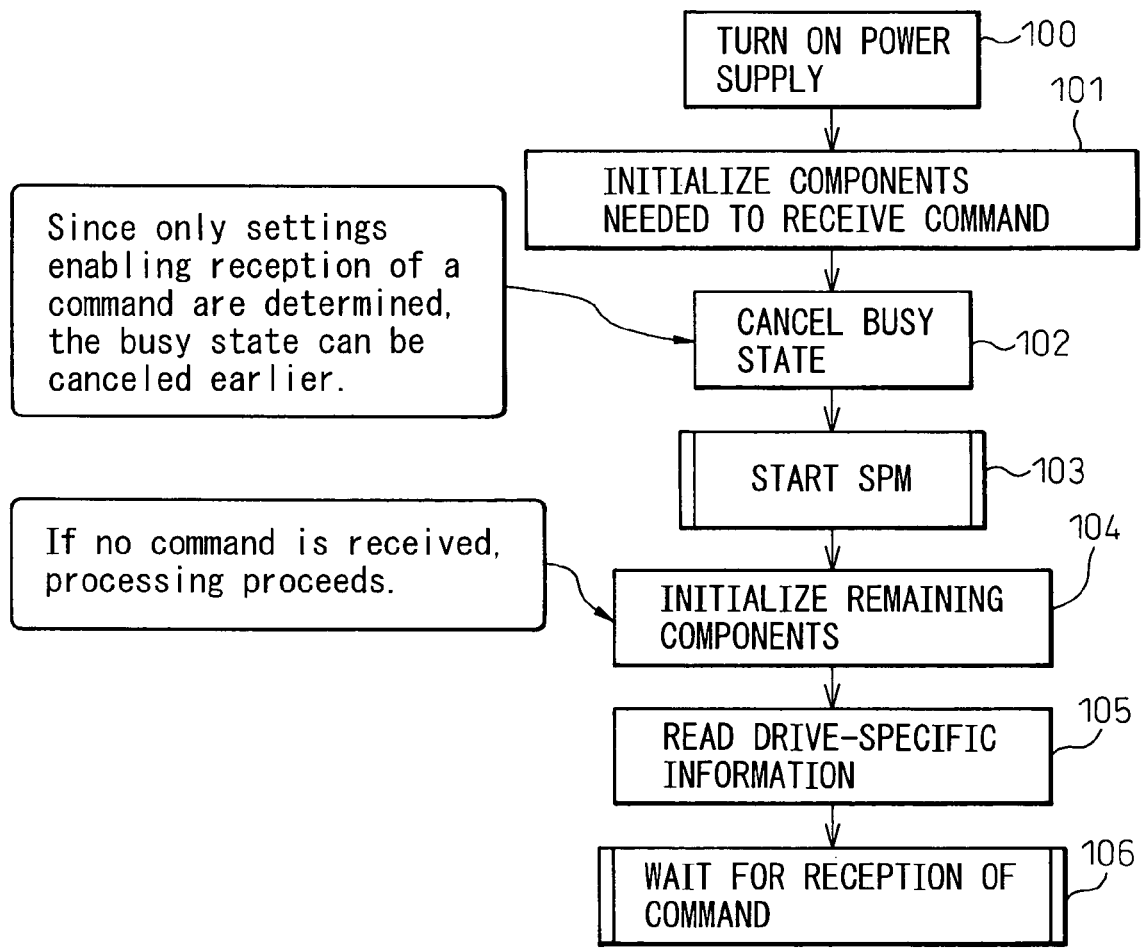
FIG. 6 is a flowchart (part 1) describing a control method for a disk drive in accordance with the first embodiment of the present invention.

FIG. 6 is a flowchart (part 1) for describing a control method for a disk drive in accordance with the first embodiment of the present invention. The control method for a disk drive in accordance with the first embodiment is implemented in the disk drive in accordance with the first aspect of the present invention.

Figure 1:
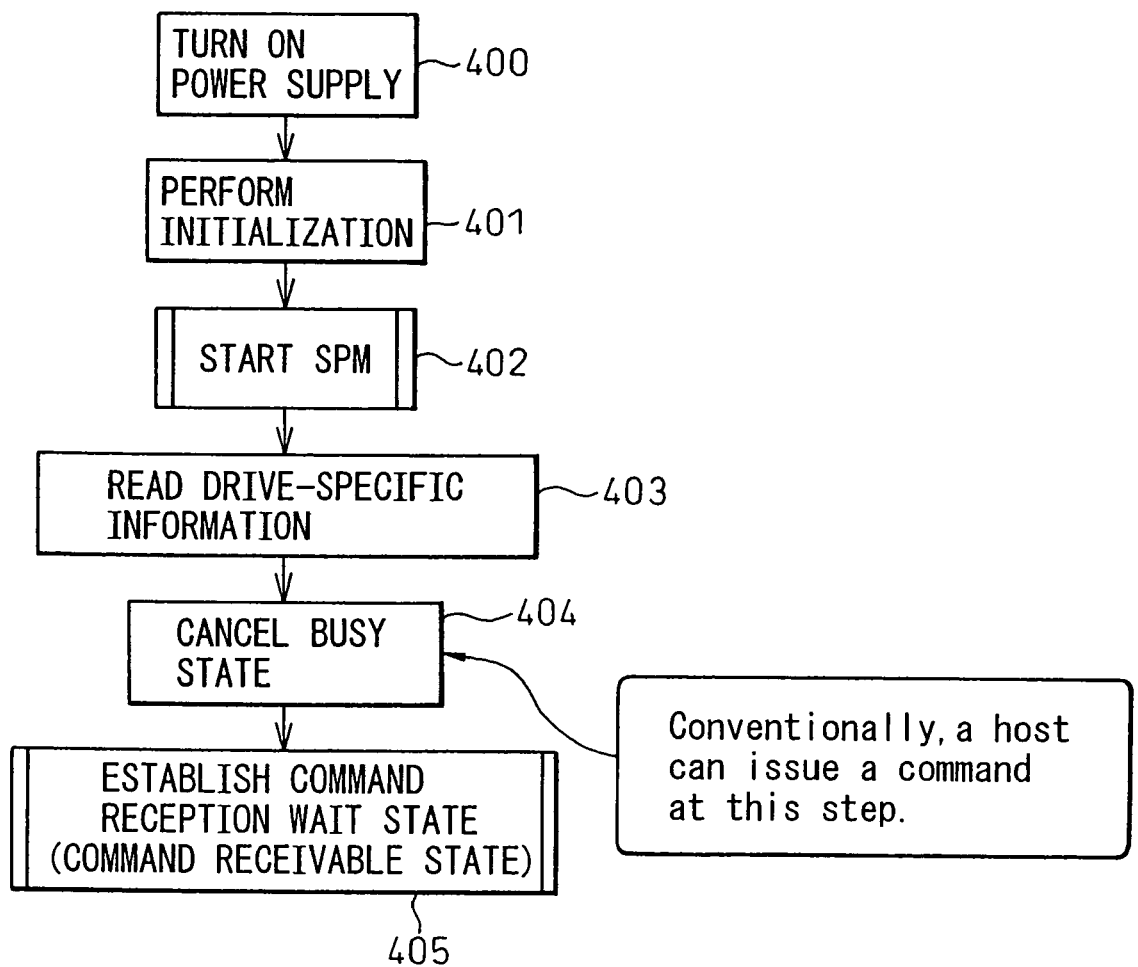
FIG. 1 is a flowchart describing the first example of a conventional control method for a disk drive.
Figure 2:
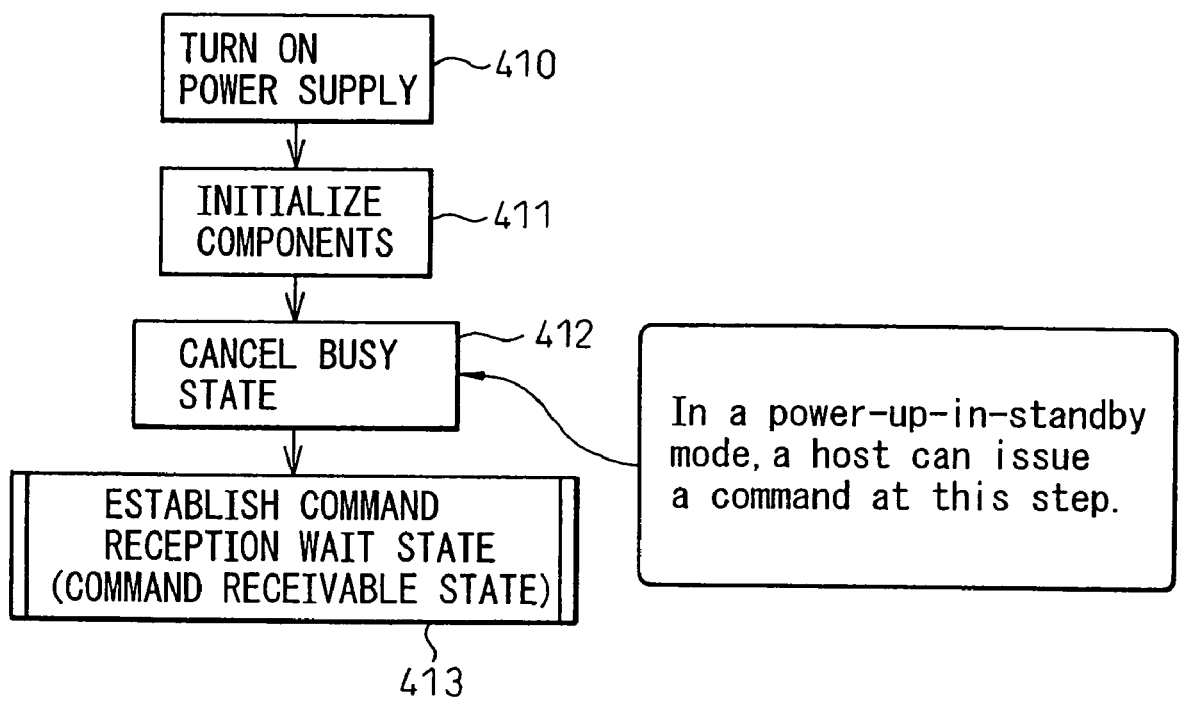
FIG. 2 is a flowchart describing the second example of the conventional control method for a disk drive.
Figure 3:
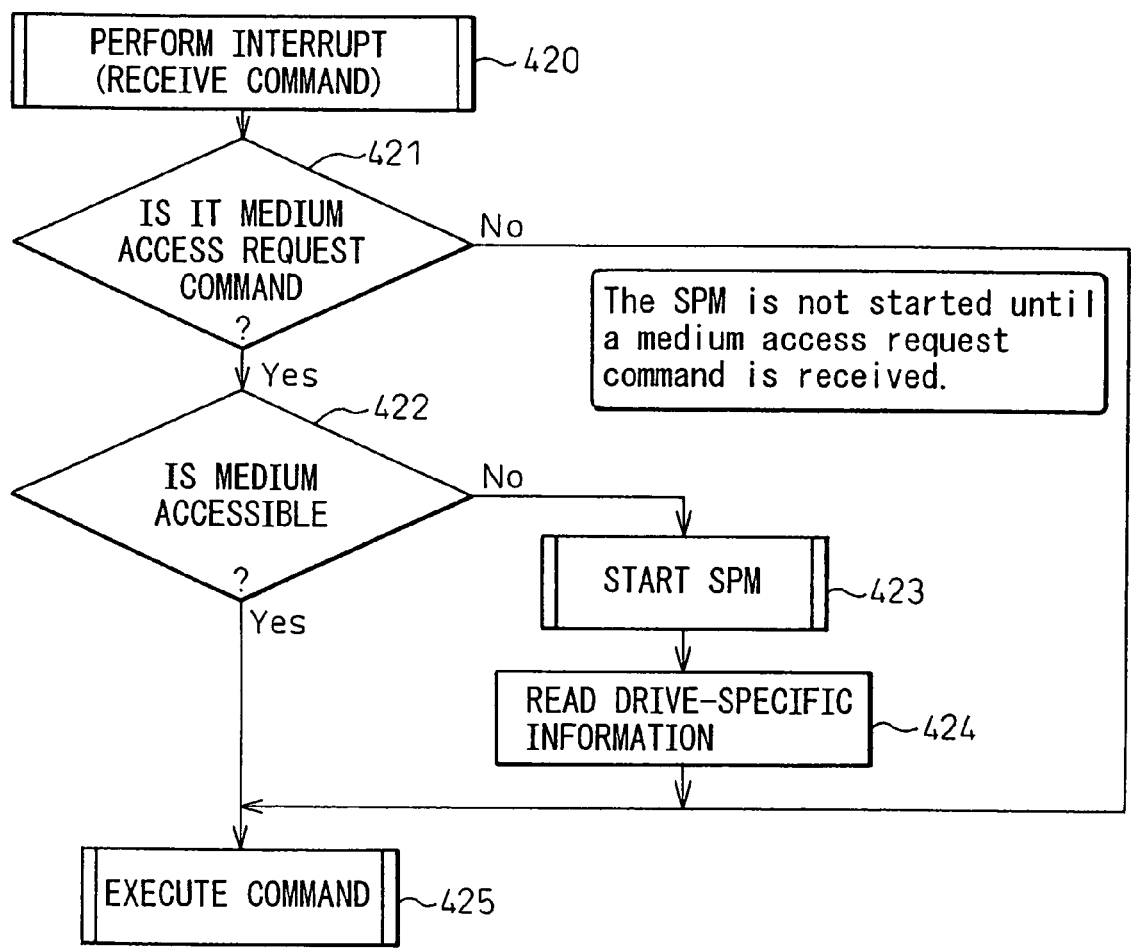
FIG. 3 is a flowchart describing the third example of the conventional control method for a disk drive.

The control method for a disk drive (part 1) in accordance with the first example of the present invention will be described below. As described in the flowchart of FIG. 6, after the power supply of a disk drive is turned on at step 100, only the initial conditions making it possible to receive a command (a command other than a medium access request command) sent from equipment (for example, a host system such as a host processor) connected to a main disk drive unit are determined (initialization in FIG. 6), but a spindle motor is not started. At step 102, the busy state of the disk drive is canceled. Therefore, the busy state can be canceled earlier than it is according to the conventional method (see, for example, FIG. 1). At this time, the command can be received. If the command is not received, subsequent steps will be executed.

Namely, at step 103, the spindle motor is started. At step 104, the remaining initial conditions are determined. At step 105, drive-specific information on the disk drive is read. At this time or at step 106, all commands including medium access request commands can be received.

Figure 7:
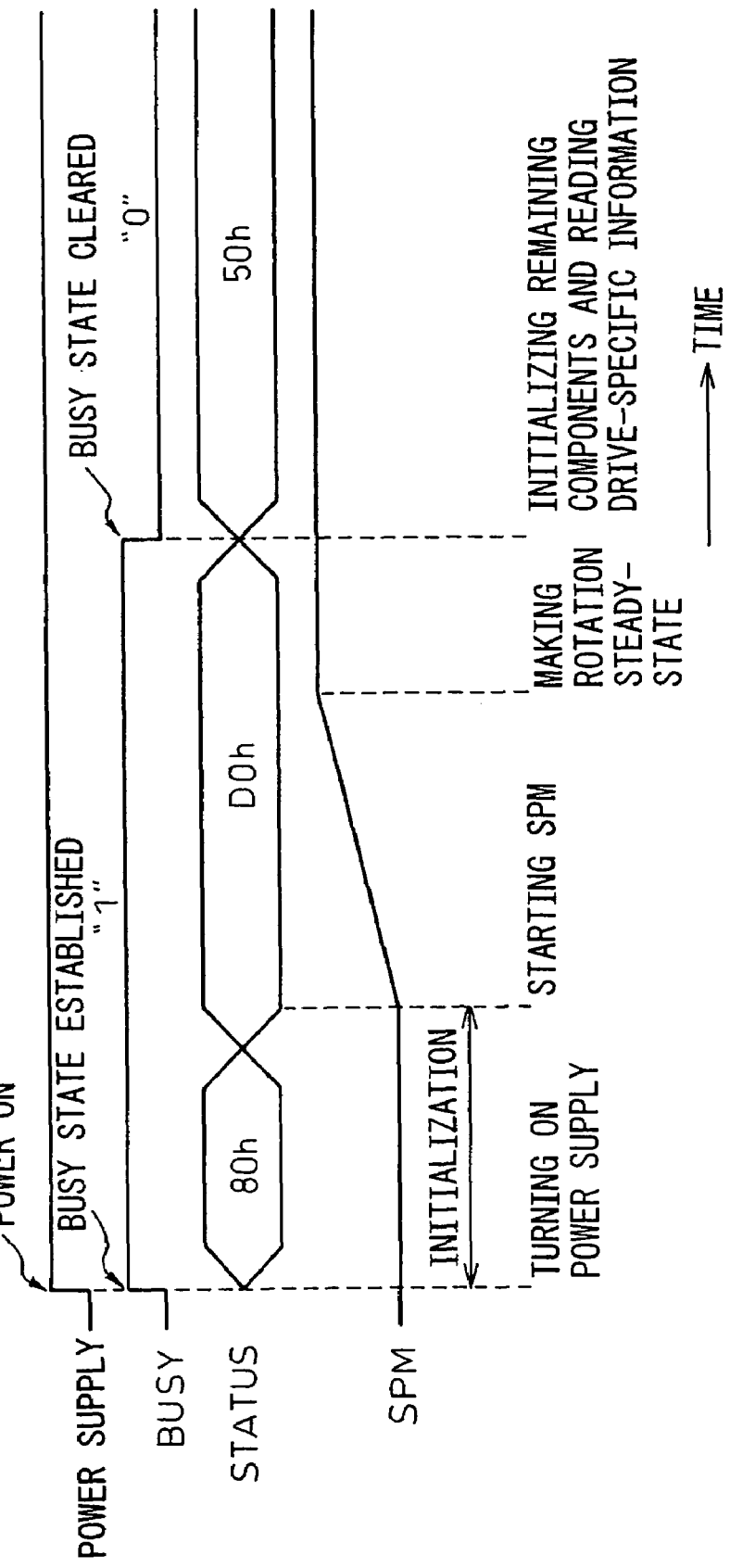
Figure 8:
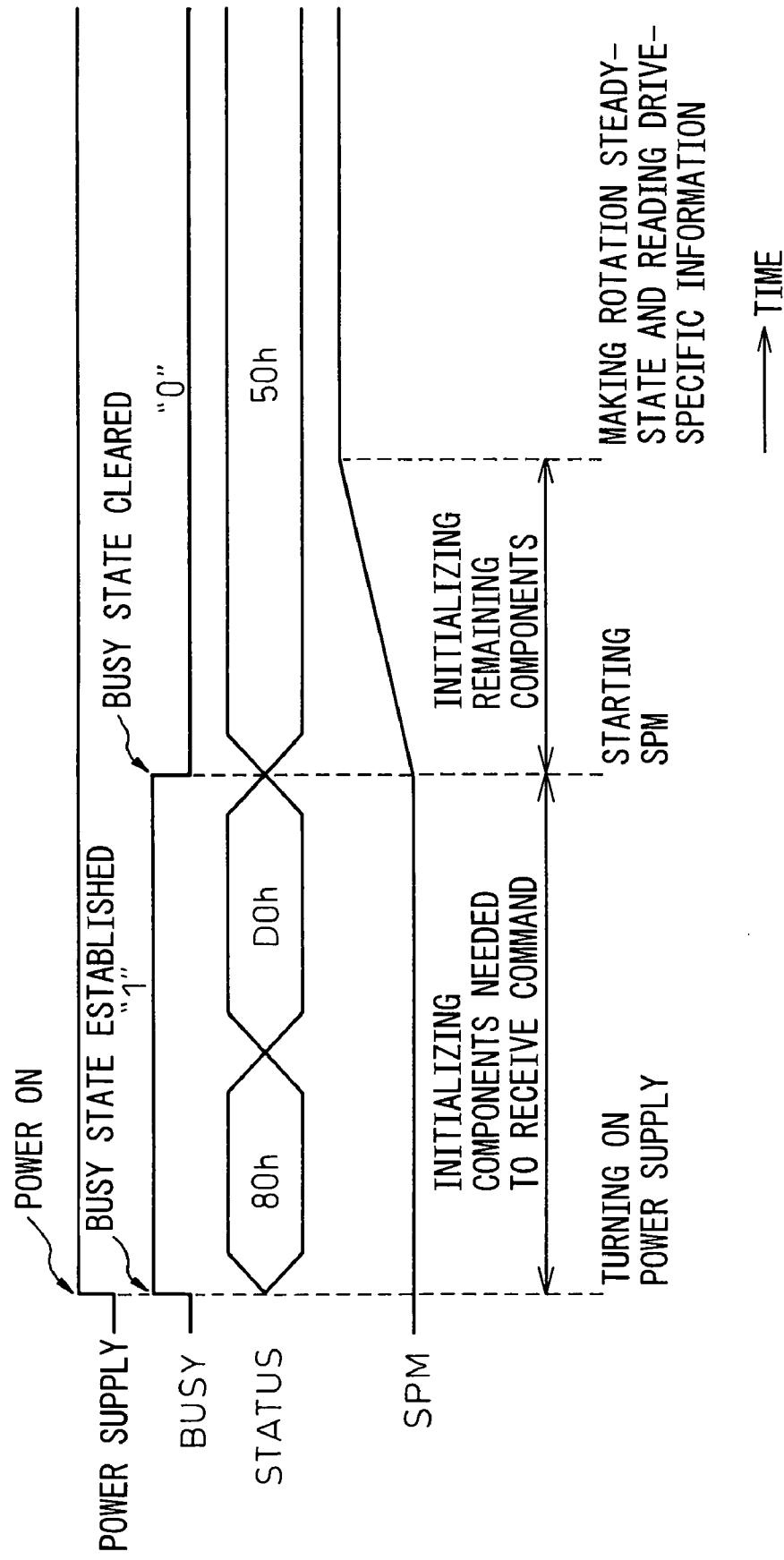

FIG. 7 is a timing chart indicating changes in states of components occurring when the power supply of a conventional disk drive is turned on. FIG. 8 is a timing chart indicating changes in states of components occurring when the power supply of the disk drive in accordance with the present invention is turned on. The timing charts indicating temporal changes in states of components occurring when the power supplies of the disk drive are turned on are used to compare the first example of the conventional control method for a disk drive described in FIG. 1 with the control method for a disk drive in accordance with the first embodiment of the present invention described in FIG. 6.

As shown in FIG. 7, in the first example of a conventional control method for a disk drive, after the power supply of the disk drive is turned on, that is, the disk drive is powered up, the busy state of the disk is established (for example, a flag indicating the busy state is changed from "0" to "1"). At this time, the initial conditions making it possible to receive every command (command other than medium access request commands) sent from external equipment connected to the main disk drive unit are determined (represented by status information of, for example, 80h or D0h). The determination of the initial conditions includes self-diagnosis of hardware of the disk drive, determination of settings of the hardware thereof, and determination of settings of firmware thereof. Furthermore, after starting the spindle motor is completed, when the rotation of the spindle motor has become steady-state, the remaining initial conditions are determined and drive-specific information representing the attributes of the disk drive is read (represented by status information of, for example, 50h). At this time, the busy state is canceled (for example, the flag indicating the busy state is changed from "1" to "0"). Now, the disk drive can receive a command.

In contrast, as shown in FIG. 8, in the control method for a disk drive in accordance with the first embodiment of the present invention, when the power supply of the disk drive is turned on, that is, the disk drive is powered up, the busy state of the disk is established (for example, a flag indicating the busy state is changed from "0" to "1"). At this time, the initial conditions making it possible to receive a command (a command other than a medium access request command) sent from external equipment connected to the main disk drive unit are determined (represented by status information of, for example, 80h), but the spindle motor is not started (represented by status information of, for example, D0h). At step 102, the busy state is canceled (for example, the flag indicating the busy state is changed from "1" to "0"). At this time, the command can be received. However, if the command is not received, the spindle motor is started and the remaining initial conditions are determined (represented by status information of, for example, 50h). After starting the spindle motor is completed, when the rotation of the spindle motor has become steady-state, drive-specific information on the disk drive is read.

As apparent from comparison of the timing chart of FIG. 7 with the timing chart of FIG. 8, according to the control method for a disk drive of the first embodiment of the present invention, the time from the instant the power supply of the disk drive 1 is turned on to the instant the busy state is canceled is shortened. Consequently, the external equipment connected to the main magnetic disk drive unit can issue a command to the disk drive at an earlier stage.

Figure 9:
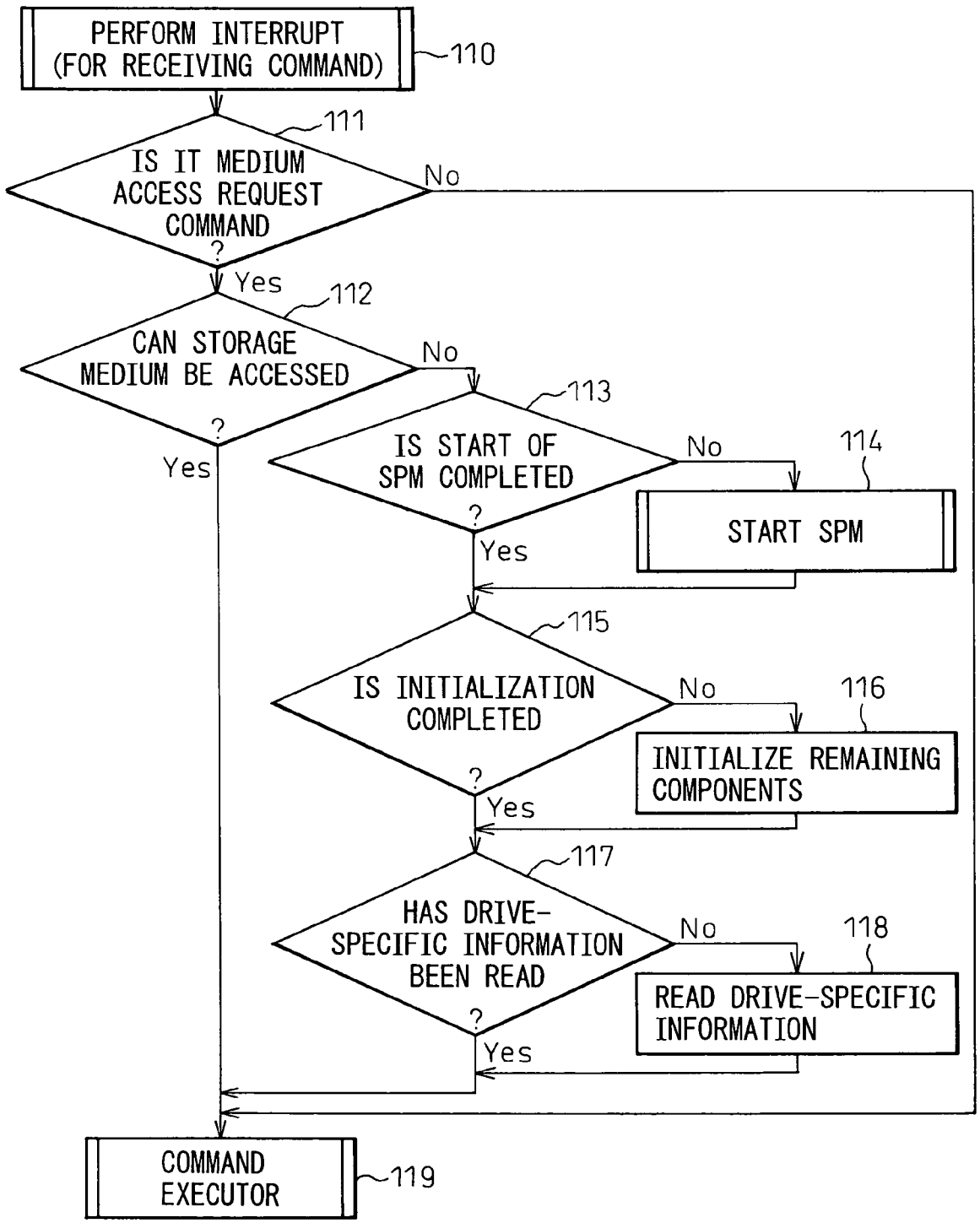
FIG. 9 is a flowchart (part 2) describing the control method for a disk drive in accordance with the first embodiment of the present invention.

FIG. 9 is a flowchart (part 2) for describing the control method for a disk drive in accordance with the first embodiment of the present invention.

Even when the processing of steps 103 to 105 described in FIG. 6 is in progress, an interrupt can be executed in order to receive a command at step 110 in FIG. 9 according to the control method for a disk drive (part 2) of the first embodiment of the present invention.

During the interrupt, a command received at step 110 is checked at step 111 to see if it is a medium access request command. If the received command is not a medium access request command (that is, if access to a storage medium is not required), control is passed to the command executor 119. If the received command is a medium access request command, whether the storage medium can be accessed during interrupt is verified at step 112. If the storage medium cannot be accessed at present, whether the spindle motor is not started is verified at step 113. The spindle motor is then started at step 114. Whether determination of the remaining initial conditions is not completed is verified at step 115. The remaining initial conditions are determined at step 116. Furthermore, whether reading of drive-specific information is not completed is verified at step 117. The drive-specific information is read at step 118. Thereafter, the storage medium is accessed in order to execute the command (processing performed by the command executor 119).

Figure 10:
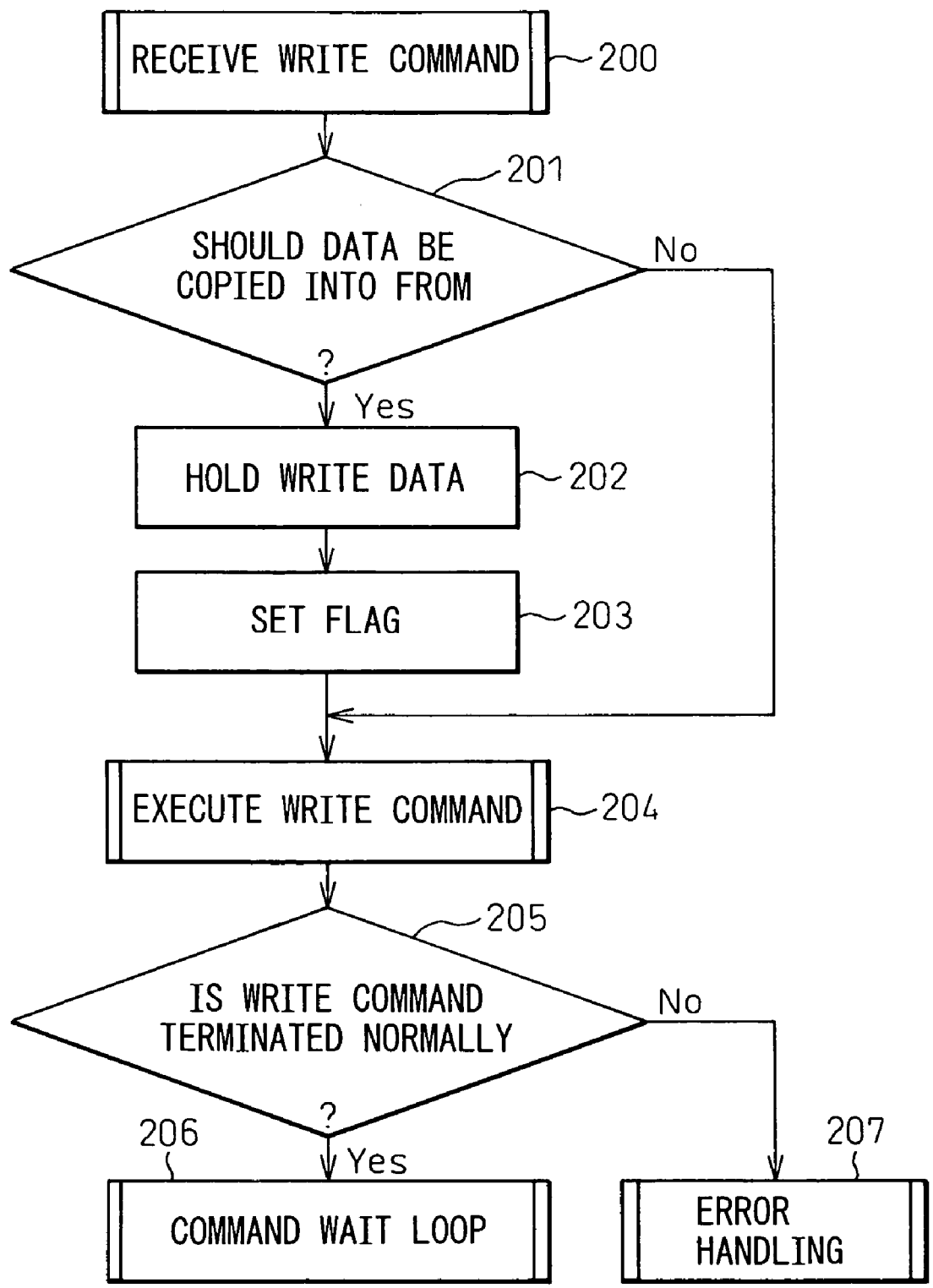
FIG. 10 is a flowchart (part 1) describing a control method for a disk drive in accordance with the second embodiment of the present invention.
Figure 11:
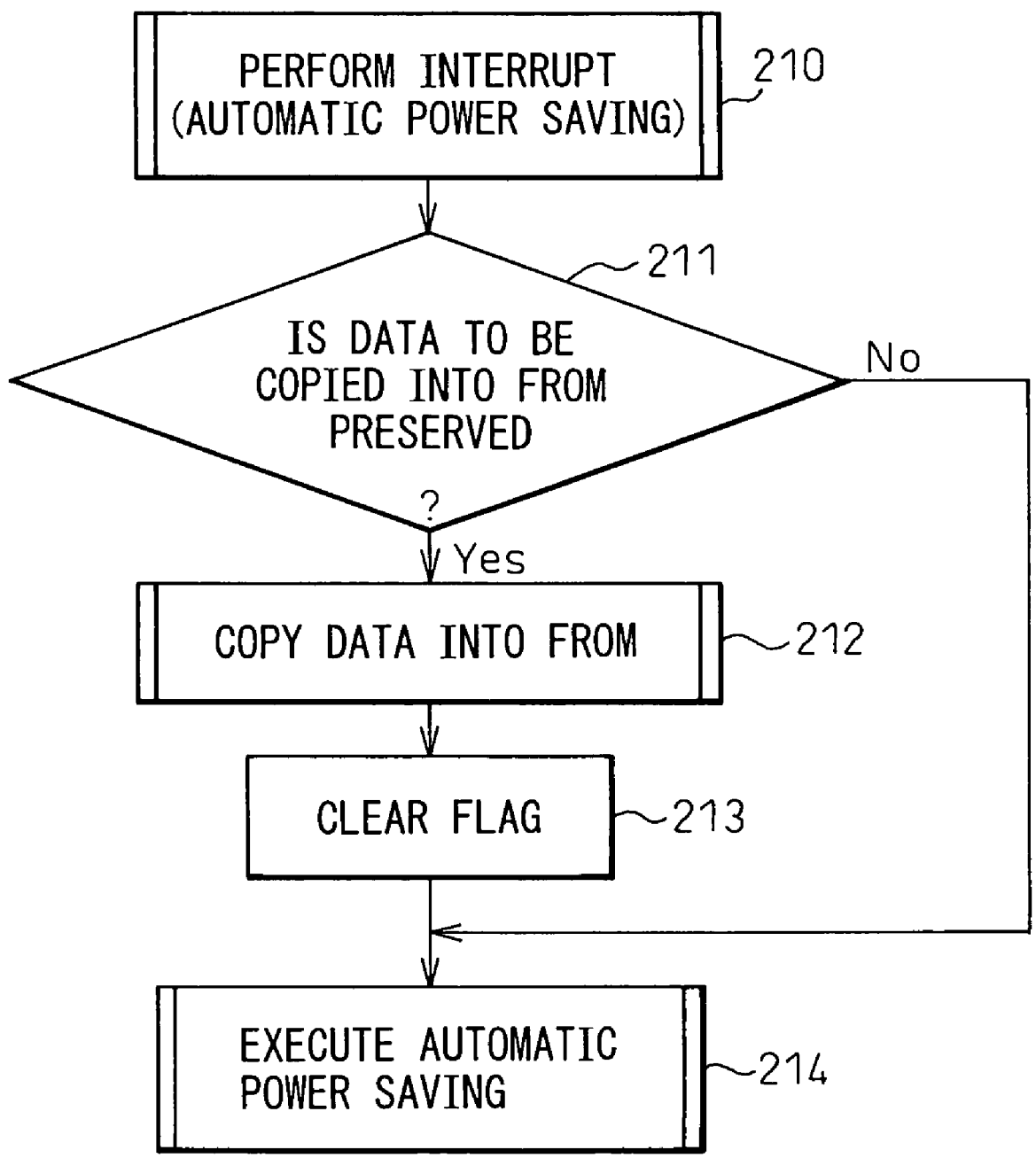
FIG. 11 is a flowchart (part 2) describing the control method for a disk drive in accordance with the second embodiment of the present invention.
Figure 12:
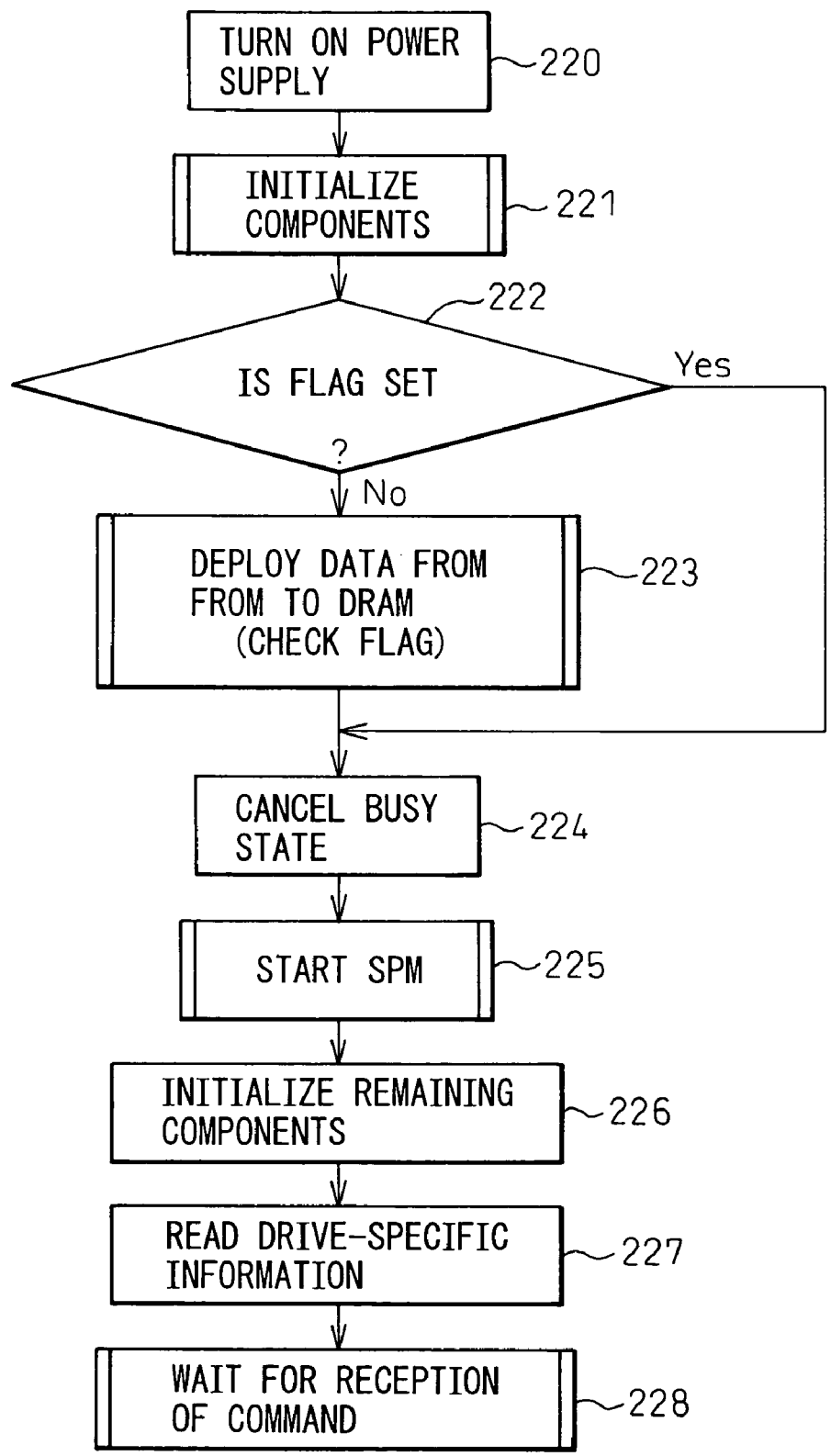
FIG. 12 is a flowchart (part 3) describing the control method for a disk drive in accordance with the second embodiment of the present invention.
Figure 13:
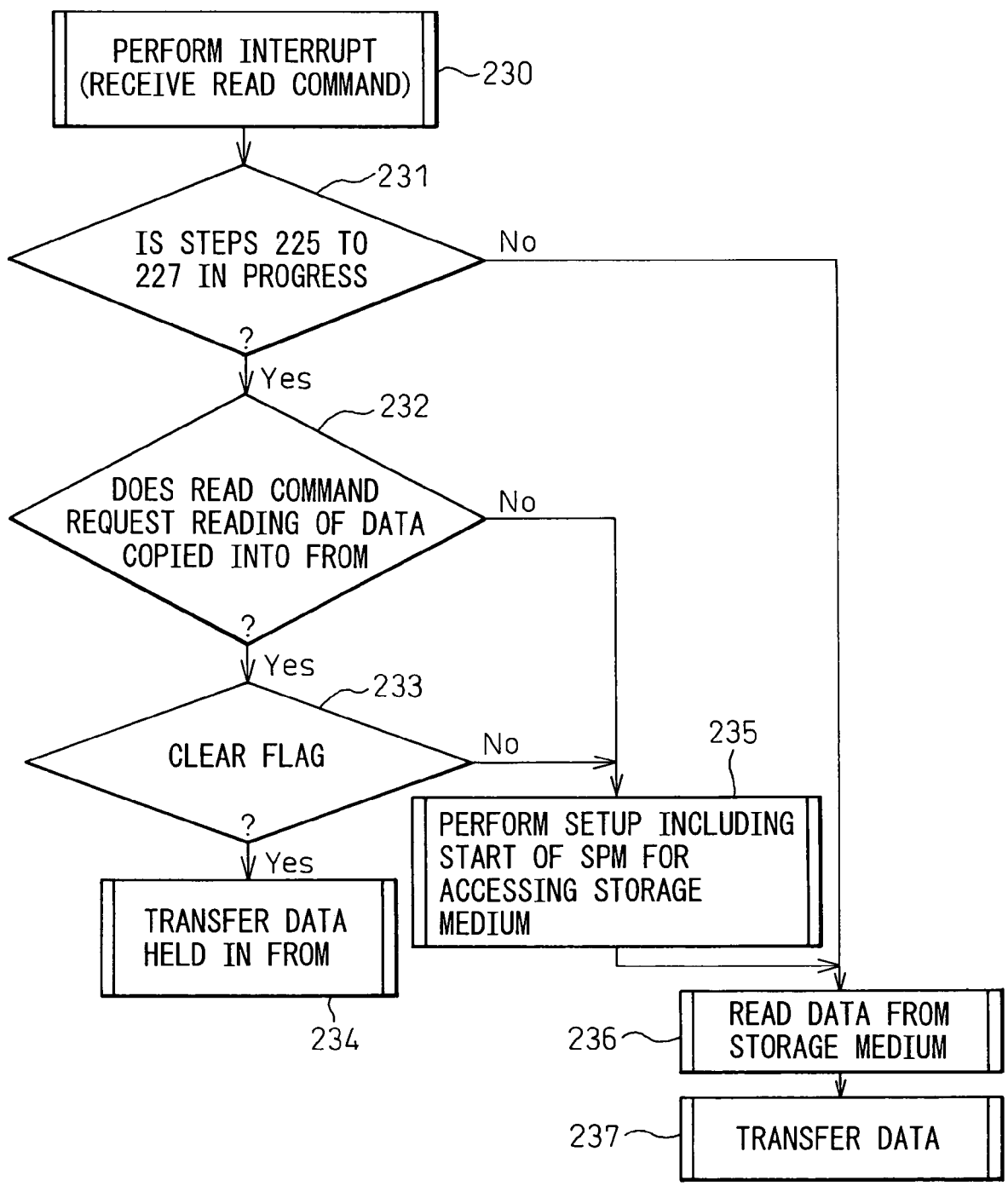
FIG. 13 is a flowchart (part 4) describing the control method for a disk drive in accordance with the second embodiment of the present invention.

FIG. 10 is a flowchart (part 1) for describing a control method for a disk drive in accordance with the second embodiment of the present invention. FIG. 11 is a flowchart (part 2) for describing the control method for a disk drive in accordance with the second embodiment of the present invention. FIG. 12 is a flowchart (part 3) for describing the control method for a disk drive in accordance with the second embodiment of the present invention. FIG. 13 is a flowchart (part 4) for describing the control method for a disk drive in accordance with the second embodiment of the present invention. The control method for a disk drive in accordance with the second embodiment is concerned with the disk drive in accordance with the second aspect of the present invention.

Herein, an area into which the data lying in ten sectors that start with a sector located at the leading position on the disk can be copied shall be reserved within the nonvolatile memory such as an FROM. A flag indicating that data is invalid (that is, a flag signifying that data in the nonvolatile memory may be rewritten) shall be set in the nonvolatile memory.

The control method for a disk drive (part 1) in accordance with the second embodiment of the present invention will be described below. As described in FIG. 10, a Write command is received at step 200. At step 201, data to be held in the nonvolatile memory such as an FROM in response to the received Write command is checked to see if it lies in the range of ten sectors starting with the sector located at the leading position on the disk. If data specified in the received Write command (which is called write data) lies in the range of ten sectors starting with the sector located at the leading position on the disk, the write data is copied into the nonvolatile memory at step 202. At step 203, a flag signifying that the data held in the nonvolatile memory is invalid is set.

The Write command is executed at step 204. At step 205, whether the executed Write command is terminated normally is verified. Processing then proceeds to a command wait loop 206. On the other hand, if the executed Write command is verified not to be terminated normally, occurrence of an error is notified through error handling 207.

The description of the control method for a disk drive (part 2) in accordance with the second embodiment of the present invention will proceed below. As described in FIG. 11, if a command has not been received for a certain period of time since processing proceeded to the command wait loop 206 (see FIG. 10), an interrupt is performed in order to execute automatic power saving for automatically saving power. At step 211, whether data to be copied into the nonvolatile memory such as an FROM is preserved is verified. At step 212, the preserved write data is copied into the nonvolatile memory such as an FROM. The flag signifying that the data in the nonvolatile memory is invalid is cleared at step 213. Finally, automatic power saving is executed at step 214.

The description of the control method for a disk drive (part 3) in accordance with the second embodiment of the present invention will proceed below. As described in FIG. 12, after the power supply of the disk drive is turned on at step 220, the initial conditions for external equipment to be connected to the main disk drive unit are determined at step 221. Specifically, data in the nonvolatile memory such as an FROM is checked to see if it is invalid (that is, to see if the flag in the nonvolatile memory is set). If the data in the nonvolatile memory is verified not to be invalid at step 222 (that is, the data in the nonvolatile memory is verified not to be rewritten), the data in the nonvolatile memory such as an FROM is deployed into a DRAM.

Furthermore, the busy state is canceled at step 224. Thereafter, the spindle motor is started at step 225, and the remaining initial conditions are determined at step 226. Drive-specific information on the disk drive is read at step 227. Consequently, at step 228, the command can be received.

Even if a Read command requesting reading of data from the range of ten sectors starting with the sector located at the leading position on the disk is received during processing of steps 225 to 227 in FIG. 12, interrupt can be executed in order to receive the Read command at step 230 in FIG. 13 according to the control method for a disk drive (part 3) in accordance with the second embodiment of the present invention.

If during the interrupt, a Read command requesting reading of data that is copied into the nonvolatile memory such as an FROM and that lies in the range of ten sectors starting with the sector located at the leading position on the disk is received at step 232 during processing (step 231) of steps 225 to 227 described in FIG. 12, as data is present in the DRAM, the flag indicating that data is invalid is checked at step 233 to see if it is cleared. At step 234, the data in the nonvolatile memory such as an FROM (which is called read data) can be transferred without access to the recording medium. On the other hand, if the flag indicating that data is invalid is not cleared at step 233, setup including start of the spindle motor is performed at step 235 in order to access the recording medium. Thereafter, data is read from the recording medium at step 236, and the data is transferred at step 237. Incidentally, the control method for a disk drive in accordance with the second embodiment is concerned with the disk drive in accordance with the third aspect of the present invention.

Figure 14:
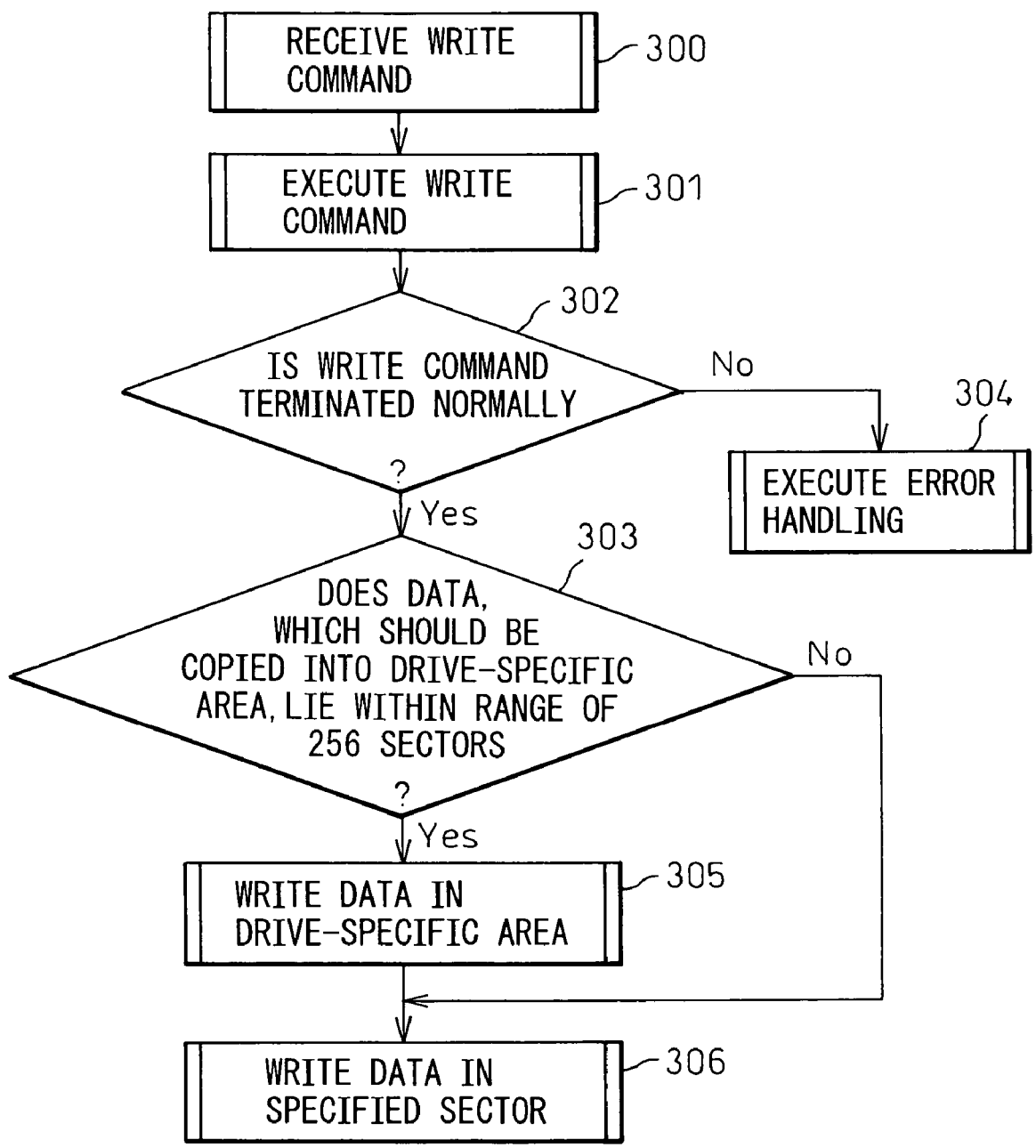
FIG. 14 is a flowchart (part 1) describing a control method for a disk drive in accordance with the third embodiment of the present invention.

FIG. 14 is a flowchart (part 1) for describing a control method for a disk drive in accordance with the third embodiment of the present invention. FIG. 15 is a flowchart (part 2) for describing the control method for a disk drive in accordance with the third embodiment of the present invention.

Herein, an area into which the data lying in 256 sectors starting with a sector located at the leading position on the disk is copied shall be reserved within a drive-specific area on the disk that cannot be accessed in response to a normal Write command.

The control method for a disk drive (part 1) in accordance with the third embodiment of the present invention will be described below. As described in FIG. 14, a Write command is received at step 300, and executed at step 301. At step 302, whether the Write command is terminated normally is verified. At step 303, data to be copied into the drive-specific area in response to the received Write command is checked to see if it lies in the range of 256 sectors starting with the sector located at the leading position on the disk. If the data specified in the received Write command (which is called write data) lies in the range of 256 sectors starting with the sector located at the leading position on the disk, the write data is written in the drive-specific area at step 305. At step 306, normal writing is executed for a sector located at a designated position on the disk. On the other hand, if the executed Write command is verified not to be terminated normally, occurrence of an error is notified through error handling 304.

The description of the control method for a disk drive (part 2) in accordance with the third embodiment of the present invention will proceed below. As described in FIG. 15, when a Read command is received at step 310, a sector located at a position of data specified in the Read command is read at step 311. Whether the Read command is terminated normally is verified at step 312. If the Read command is terminated normally, processing proceeds to normal command handling at step 313.

On the other hand, if an error occurs during execution of the Read command, a sector in which the error has occurred is checked at step 314 to see if it falls within the range of 256 sectors starting with the sector located at the leading position on the disk. If the sector falls within the range of 256 sectors, data is read at step 315 from the drive-specific area instead of the sector in which the error has occurred. If the sector in which the error has occurred does not fall within the range of 256 sectors starting with the sector located at the leading position on the disk, occurrence of the error is notified through error handling 318.

As mentioned above, when data is read from the sector specified in the Read command, if an error occurs, the data is read from the drive-specific area. In this case, at step 316, the data read from the drive-specific area is used to rewrite the sector in which the error has occurred. At step 317, data restored through the rewriting is transferred. The processing then proceeds to normal command handling.

Generally-known reassignment is performed on the assumption that data can be read from a sector specified in a Read command. It should be noted that the reassignment is different from rewriting to be performed when data cannot be read from a sector specified in the Read command.

Finally, the industrial applicability of the present invention will be described below. The present invention provides a disk drive that uses a head to write data at any position on a storage medium such as a magnetic disk or to read data written at any position. The present invention can apply to a disk drive required to shorten the startup time of equipment such as a host processor connected to a main disk drive unit and also required to improve the reliability of data, of which the use frequency is high, at the time of starting up the equipment.

The invention claimed is:

1. A disk drive that includes a spindle motor which drives a disk so that the disk will rotate and a voice coil motor which drives a head so that the head will reciprocate between a position inside the disk and a position outside it, and that uses the head to write data at any position on the disk or read data written at any position, the disk drive comprising:
   a first initial-condition determination means for, after the power supply of the disk drive is turned on, determining only the first initial conditions for the disk drive which are needed to receive a command from outside and execute the command;
   a command reception enabling means for bringing the disk drive to a state, in which the disk drive can receive the command, without starting the spindle motor; and
   a second initial-condition determination means for, after the disk drive is brought to the state in which it can receive the command, starting the spindle motor and determining the second initial conditions including all initial conditions other than the first initial conditions.

2. A control method, for a disk drive which includes a spindle motor that drives a disk so that the disk will rotate and a voice coil motor that drives a head so that the head will reciprocate between a position inside the disk and a position outside it, and which uses the head to write data at any position on the disk or read data written at any position, wherein the control method comprises the steps of:
   after the power supply of a disk drive is turned on, determining only the first initial conditions for the disk drive that are needed to receive a command from outside and execute the command;
   bringing the disk drive to a state, in which the disk drive can receive the command, without starting the spindle motor; and
   after the disk drive is brought to the state in which it can receive the command, starting the spindle motor and determining the second initial conditions including all initial conditions other than the first initial conditions.

3. A computer readable storage medium in which a program is stored, the program instructing a computer to:
   after the power supply of a disk drive including a spindle motor that drives a disk so that the disk can rotate and a voice coil motor that drives a head so that the head can reciprocate between a position inside the disk and a position outside it is turned on, determine only the first initial conditions for the disk drive that are needed to receive a command from outside and execute the command;
   bring the disk drive to a state, in which the disk drive can receive the command, without starting the spindle motor; and
   after the disk drive is brought to the state in which it can receive the command, start the spindle motor and determine the second initial conditions including all initial conditions other than the first initial conditions.

* * * * *